United States Patent [19]

Benson

[11] 4,328,098

[45] May 4, 1982

[54] FILTER APPARATUS

[75] Inventor: Robert A. Benson, Cohasset, Mass.

[73] Assignee: Seapower, Inc., Weymouth, Mass.

[21] Appl. No.: 260,093

[22] Filed: May 4, 1981

Related U.S. Application Data

[63] Continuation-in-part of Ser. No. 139,839, Apr. 14, 1980, Pat. No. 4,267,043.

[51] Int. Cl.³ ............................................. B01D 29/42
[52] U.S. Cl. .................................. 210/195.1; 210/241; 210/405; 210/414
[58] Field of Search ...................... 210/167, 194, 195.1, 210/241, 242.2, 242.3, 242.4, 350, 396, 397, 398, 400, 405, 413, 414, DIG. 5, 924

[56] References Cited

U.S. PATENT DOCUMENTS

| | | | |
|---|---|---|---|
| 3,608,727 | 9/1971 | Grutsch | 210/350 |
| 3,616,932 | 11/1971 | Bancroft | 210/405 |
| 3,640,394 | 2/1972 | Brill | 210/396 |
| 3,695,173 | 10/1972 | Cox | 210/414 |
| 3,943,033 | 3/1976 | Wallen | 210/414 |
| 3,986,959 | 10/1976 | Bagot | 210/924 |
| 4,123,354 | 10/1978 | Williams | 210/242.2 |
| 4,197,204 | 4/1980 | Mathes | 210/DIG. 5 |
| 4,267,043 | 5/1981 | Benson | 210/241 |

FOREIGN PATENT DOCUMENTS 133463 3/1959 U.S.S.R. .............................. 210/414

Primary Examiner—Ernest G. Therkorn

[57] ABSTRACT

Filter apparatus for continuously separating filterable mixtures, such as fluid-solid or fluid-fluid mixtures, includes a closed loop tubular enclosure having an inlet, at least one filter section spaced downstream from the inlet, and a plurality of longitudinally spaced driving disks within the enclosure mounted for movement downstream therearound, the driving disks preferably being driven downstream through the enclosure by fluid flow from the inlet to the filter section for discharging at least a portion of the fluid. A backflow preventing portion of reduced inner cross section area may be provided upstream from the inlet and a residual material outlet may also be provided.

8 Claims, 5 Drawing Figures

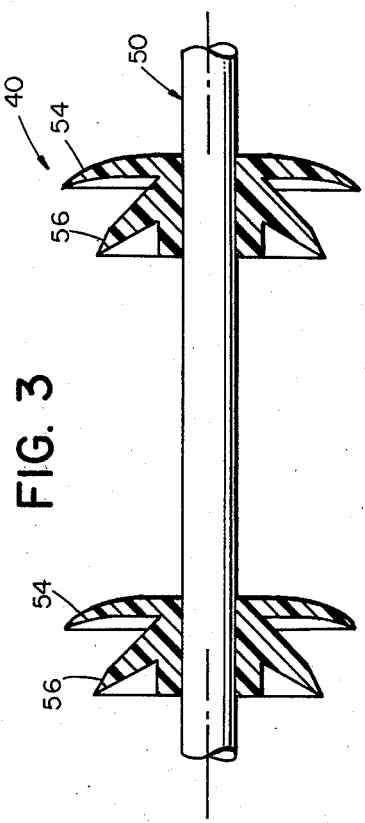
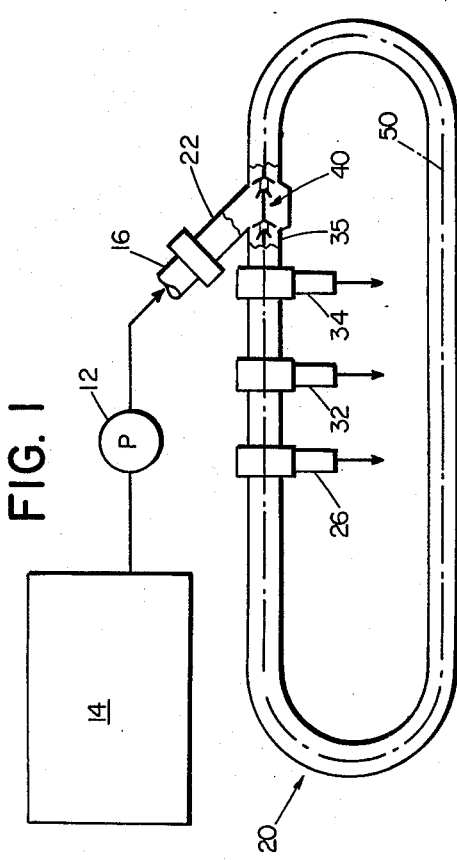
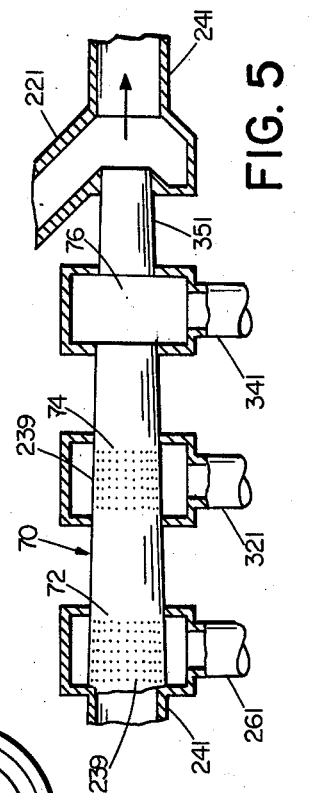
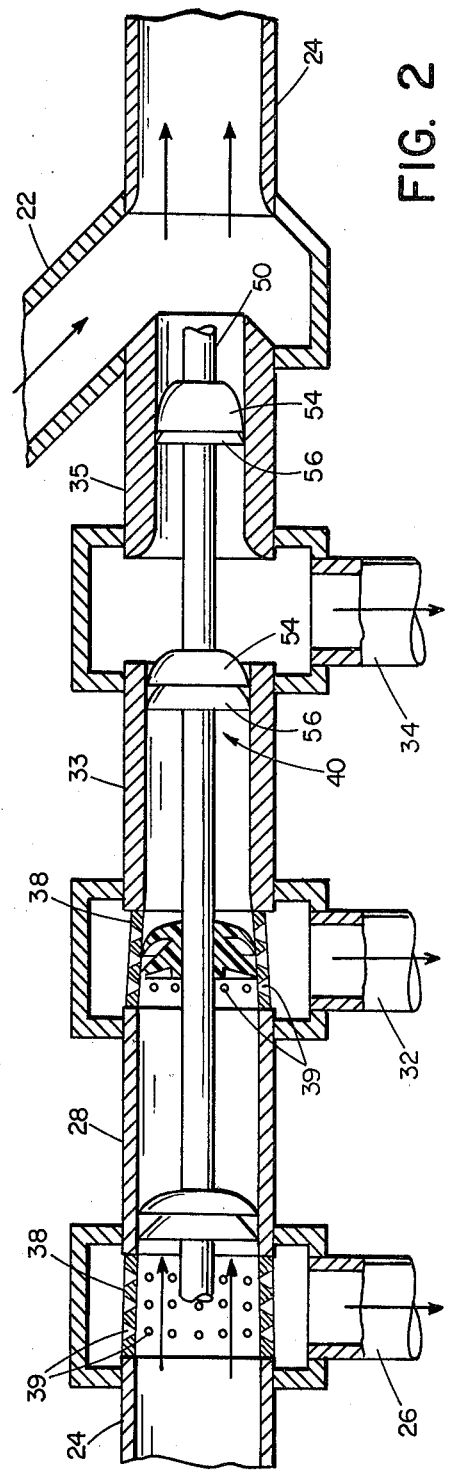

FILTER APPARATUS

This application is a continuation-in-part of my application Ser. No. 139,839, filed Apr. 14, 1980, now U.S. Pat. No. 4,267,043, issued May 12, 1981. Its invention relates to filter apparatus for continuously separating mixtures having a filterable component.

Conventional filters for separating filterable mixtures, such as fluid-solid mixtures, usually by providing a filter surface or matrix material onto or into which the solid is deposited for later removal, leave much to be desired. Among other problems, their flow rate decreases as the layer or amount of solids builds up, requiring that the filter surface or material be periodically replaced or cleaned by removing the solids to prevent it from becoming clogged. Continuous filters, in which the solids are continuously removed from the filter surface, tend to be unduly bulky and mechanically complicated, particularly those capable of operation at high rates of flow.

Accordingly, it is a major object of the present invention to provide novel apparatus for separating filterable mixtures, such as fluid-solid or fluid-fluid mixtures, at high flow rates without clogging the filter surface.

In my U.S. Pat. No. 4,267,043, which I incorporate by reference, is disclosed apparatus capable of continuous operation at high rates of flow for separating immiscible liquid mixtures, such as oil-water mixtures, and useful, for example, either for recovering reusable oil from oil-water mixtures or for recovering clean water from such mixtures.

In accordance with my present invention, I have now discovered that the apparatus of that patent may be modified to provide novel filter apparatus for continuously separating filterable mixtures having a filterable component.

The apparatus of the present invention includes a closed loop tubular enclosure having an inlet, at least one filter section spaced downstream from the inlet, and a plurality of longitudinally spaced driving disks within the enclosure mounted for movement downstream therearound for discharging at least a portion of the filterable component through the filter section.

The enclosure preferably has a backflow preventing, differential piston portion of reduced inner cross section area upstream from the inlet and downstream from the filter section between the filter section and the inlet for driving the driving disks downstream through the enclosure by flow from the inlet to the filter section. The enclosure may also have a filter flow increasing portion of reduced inner cross section area adjacent the filter section.

For use as a filter for continuously separating from a filterable mixture, a filterable component, which may be a fluid, either a gas or a liquid, from a residual component, which may be a liquid or a particulate solid, or for concentrating such a mixture, a residual material outlet is provided.

For continuously treating a fluid by exposing it to a solid, for example, a pelletized catalyst or other chemical, the residual material outlet may be omitted, so that the treating solid may be continuously circulated within the enclosure, with the fluid continuously entering at the inlet for treatment and leaving at the filter section after treatment.

For the purpose of fully disclosing preferred embodiments of the invention, reference is now made to the following detailed description thereof, together with the accompanying drawings, wherein:

FIG. 1 is a diagrammatic side view of the apparatus of the invention;

FIG. 2 is an enlarged side sectional view of a portion of the apparatus of FIG. 1;

FIG. 3 is an enlarged side view of a portion of the longitudinally spaced driving disks of the apparatus of FIG. 1;

FIG. 4 is an enlarged side view of a portion of the longitudinally spaced driving disks of the apparatus of FIG. 1, shown in operation at a filter section; and FIG. 5 is a side sectional view of a modification of the portion shown in FIG. 2 of the apparatus of FIG. 1.

The apparatus of the present invention is useful for continuously separating filterable mixtures having a filterable component, usually a gas or a liquid, and a residual component, usually a particulate solid, but which also may be a liquid.

The following description of the filter apparatus of the invention and its operation refers to its use for continuously separating a filterable fluid, such as oil, from a particulate solid, such as sand, by providing a residual material outlet.

Although the description of the filter apparatus of the invention and its operation refers to the separation of oil-sand mixtures, it is understood that the use of the filter apparatus of the invention is not limited to the separation of oil-sand mixtures, but may be used to separate a wide variety of other filterable mixtures as well.

Referring to the drawings and particularly to FIG. 1 thereof, the novel apparatus of the present invention, in general, includes a closed loop tubular enclosure, generally designated 20, having an oil-sand mixture inlet 22, a first oil filter section having an outlet 26 spaced from inlet 22 by an extended driving portion 24 of enclosure 20, a second oil filter section having an outlet 32 and a residual material outlet 34 for the sand and remaining oil located between the second oil filter section outlet 32 and inlet 22. Pump 12 is provided for feeding an oil-sand mixture to be separated from reservoir 14 into inlet pipe 16 connected to inlet 22. The filtered, sand-free oil is discharged through filter section outlets 26 and 32. The sand and the remaining portion of the oil are discharged through residual material outlet 34, either for continuous discharge or into a collecting sump. In the latter situation, the residual material outlet may even be located upstream from the filter section if the residual material is free to circulate continuously around enclosure 20.

The inner walls of enclosure 20 are preferably cylindrical of predetermined cross section area, as hereinafter more fully explained, with the inner cross section area of enclosure 20 being generally constant throughout its driving portion 24 to the first filter section at outlet 26.

More specifically, as best shown in FIGS. 2 and 4, the first and second filter sections are each provided with a filter element 38 having a plurality of filter openings 39 connecting its interior to filter section outlets 26 and 32. As best shown in FIG. 4, filter openings 39 are preferably of frusto-conical shape with their smaller ends at the interior surface of filter elements 38 to prevent clogging by sand particles 37 and may have a diameter at the inner surface of filter element 38 of about 80 microns for this purpose. As is well understood in the filter art, a wide variety of known filtering elements, including porous membranes, having filtering openings of any desired size or type may be utilized, according to the size and type of particulate solid or other residual material component, including liquids, from which the filterable component is to be removed.

As shown in FIG. 2, the cross section of enclosure 20 adjacent the first filter section outlet 26 is progressively decreased in cross section area by providing it with a first reduced cross section portion 28 between first filter section outlet 26 and second filter section outlet 32, a second further reduced cross section portion 33 between second filter section outlet 32 and residual material outlet 34, and a third still further reduced cross section portion 35 between residual material outlet 34 and inlet 22.

Alternatively, as shown in FIG. 5, the progressively decreasing cross section may be provided by utilizing a frusto-conical enclosure section, generally designated 70, with its largest end connected to the downstream end of driving section 241. Frusto-conical section 70 provides a first oil filter section 72 having filter openings 239 communicating with the first filter section outlet 261, a second oil filter section 74 having filter openings 239 communicating with second oil filter section outlet 321 and an open residual material outlet section 76 communicating with residual material outlet 341, with the smallest diameter portion 351 of frusto-conical section 70 being located between residual material outlet 341 and inlet 221.

It is also contemplated that more than a single working section, consisting of an inlet followed by cooperating filter sections and residual material outlets, may be arranged within a single closed loop tubular enclosure.

As shown in FIGS. 2 and 3, a radially compressible assembly, generally designated 40, of generally cylindrical cross section configuration, is movably mounted within enclosure 20 with its periphery usually but not invariably in contact with the inner wall of enclosure 20. It extends continuously around enclosure 20 for continuous movement therein, driven by the hydraulic force of the oil-sand mixture through the working section of the apparatus from inlet 22 or 221, in a downstream direction from inlet 22 or 221, first to first filter section outlet 26 or 261, next to second filter section outlet 32 or 321 and last to residual material outlet 34 or 341.

More specifically, as shown in FIG. 3, the radially compressible assembly 40, in general, includes a central axial support 50, in the form of a closed and continuous loop extending around enclosure 20 therewithin supporting a series of radially compressible, longitudinally spaced, driving and sealing disks 54 and 56. Leading driving and sealing disk 54 and trailing driving and sealing disk 56 are both of imperforate elastomeric material, with at least sealing disk 54 having an uncompressed outer diameter slightly more than the inner diameter of enclosure driving portion 24 and sealingly contacting its inner walls, both for sealing and wiping the inner surfaces of filter elements 38 to prevent clogging of their perforations 39 and for sealing at its portion 35 or 351.

For the most efficient driving and sealing of assembly 40, the axial spacing between successive driving and sealing disks 54 and 56 and the axial spacing between and the length of the reduced portions may be such that, in operation, a driving and sealing disk 54 or 56 is always present within one of the reduced portions, so that each of outlets 26 or 261, 32 or 321 and 34 or 341 and inlet 22 or 221 will be sealed from one another during operation. This arrangement provides improved pressure sealing and flow between the individual outlets and improved sealing upstream from the inlet.

If desired, for improved cleaning of the inner surfaces of filter elements 38, brush-like fibers similar to those shown in my said patent may be mounted on support 50 between successive pairs of driving and sealing disks 54 and 56.

It is also contemplated that a plurality of individual radially compressible assemblies can be mounted on short individual central axial supports to partially or entirely fill enclosure 20, with a front surface of a leading driving and sealing disk forming a bearing surface with a back surface of a preceding trailing driving and sealing disk.

In operation, the stream of oil-sand mixture entering inlet 22 or 221 drives the radially compressible assembly 40 in a downstream direction within tubular enclosure 20, shown by arrows in the drawings, both by the kinetic force created by the flow of the mixture pump 12 and by the differential piston hydraulic force created by the difference in diameter between driving portion 24 or 241 and third reduced portion 35 or 351.

As best shown in FIG. 4, when assembly 40 encounters the first and second reduced portions 28 and 33 of enclosure 20 or the equivalent conical portions adjacent filter elements 72 or 74, a portion of the oil is filtered by filter openings 39 or 239 and is discharged as sand-free oil through oil filter section outlets 24 and 32 or 261 and 321, in proportion to the difference in inner cross-sectional area within enclosure 20 immediately upstream and downstream of the filter section, while the sand particles 37 remain in tubular enclosure 20.

As assembly 40 is propelled beyond the second reduced portion 33 or along the equivalent conical portion, the sand particles 37 and the remainder of the oil are discharged through residual material outlet 34 or 341.

The third and final reduced portion 35 or 351 located immediately upstream from inlet 22 or 221 also provides other functions which are important to the operation of the apparatus of the invention.

The first of these is its provision of a differential piston, since the internal diameter of the final reduced portion 35 or 351 is less than that of the internal diameter of the succeeding driving portion 24 or 241, which makes possible the driving of assembly 40 around enclosure 20 solely by hydraulic force.

In addition, kinetic hydraulic driving force is produced by the jet pump effect provided by the downstream slope of inlet 22 or 221, although this is usually of less importance than the hydraulic driving force provided by the aforementioned differential piston effect, to the extent that a perpendicular rather than a sloped inlet may be used. However, if desired, it is contenplated that the driving force may be provided solely by kinetic driving force, to the extent that the reduced portion can be omitted.

Another important function provided by reduced portion 35 or 351 is that of backflow prevention by preventing assembly 40 from being driven backwards through enclosure 20. This function prevents the oil-sand mixture entering inlet 22 or 221 from flowing in the reverse direction directly from inlet 22 or 221 to residual material outlet 34 or 341, without passing through the filter section of the apparatus.

Still another function which may be provided by reduced portion 35 or 351, if desired, is that of squeezing and sealing by the sealing disks 54 and 56 to discharge substantially all of the residual material at the outlet 34 or 341 and prevent it from passing through to the inlet 22 or 221. However, it should be understood that if it is desired to continuously circulate a particulate solid, reduced portion 35 or 351 cannot be so restricted.

The filter apparatus of the invention may also be used for separating mixtures of gaseous and liquid components, or for separating mixtures of immiscible liquid components, an example of the latter being the separation of water-free gasoline from a mixture of gasoline and water by filtering the gasoline through a filter element having openings of a size appropriate to allow the passage of water and removing the residual gasoline-water mixture at the residual material outlet.

In addition, the filter apparatus of the invention may be used for continuously treating a filterable fluid component, either a gas or a liquid, by exposing it to a particulate solid, such as a chemical treating agent, retained between the successive pairs of the spaced driving disks and driven around the enclosure by the force of the fluid to be treated. For such use, the residual material outlet is omitted, and the treating solid is continuously circulated around the enclosure, with the fluid to be treated continuously entering at the inlet for treatment and leaving at the filter section after treatment.

It is also contemplated that pressure regulating devices can be provided, for example, at the residual material outlet, in order to increase the pressure drop across the filter sections and so provide high pressure filtration, or the entire system can be pressurized for high temperature operation or otherwise, as desired.

Further modifications of the novel apparatus of the invention, within the spirit thereof and the scope of the appended claims, will be apparent to those skilled in the art.

What is claimed is:

1. Filter apparatus for continuously separating filterable mixtures having a filterable component, including
   a closed loop tubular enclosure having an inlet
   at least one filter section associated with an outlet spaced downstream from said inlet, and
   a plurality of longitudinally spaced driving disks within said enclosure mounted for movement of said filterable mixture around said closed loop enclosure
   said driving disks being driven downstream through said enclosure for discharging at least a portion of said filterable component through said filter section.

2. Filter apparatus for continuously separating filterable mixtures having a filterable component and a residual component, including
   a closed loop tubular enclosure having an inlet
   at least one filter section associated with an outlet spaced downstream from said inlet
   a residual material outlet, and
   a plurality of longitudinally spaced driving disks within said enclosure and mounted for movement of said filterable mixture around said closed loop enclosure
   said driving disks being driven downstream through said enclosure past said filter section for discharging at least a portion of said filterable component through said filter section and said residual material component through said outlet.

3. Filter apparatus as claimed in claim 1 or 2, wherein
   said enclosure has a backflow preventing, differential piston portion of reduced inner cross section area upstream from said inlet and downstream from said filter section between said filter section and said inlet for driving said driving disks downstream through said enclosure by flow from said inlet to said filter section.

4. Filter apparatus as claimed in claim 3, wherein
   said plurality of longitudinally spaced driving disks within said enclosure are radially compressible and sealingly contact its inner walls in said backflow preventing portion.

5. Filter apparatus for continuously separating filterable mixtures having at least one filterable component and a residual component, including
   a closed loop tubular enclosure having an inlet
   at least one filter section spaced downstream from said inlet
   a residual material outlet, and
   a plurality of radially compressible longitudinally spaced driving disks within said enclosure and mounted for movement downstream therearound
   said driving disks being driven downstream through said enclosure past said filter section for discharging at least a portion of said filterable component through said filter section and said residual material component through said outlet
   said enclosure having a backflow preventing, differential piston portion of reduced inner cross section area upstream from said inlet and downstream from said filter section between said filter section and said inlet for driving said driving disks downstream through said enclosure by flow from said inlet to said filter section, and
   said plurality of radially compressible longitudinally spaced driving disks within said enclosure sealingly contacting its inner walls at least in said backflow preventing portion.

6. Filter apparatus for continuously separating filterable mixtures having at least one filterable component and a residual component, including
   a closed loop tubular enclosure having an inlet
   at least one filter section spaced downstream from said inlet
   a residual material outlet spaced downstream from said filter section and upstream from said inlet between said filter section and said inlet, and
   a plurality of radially compressible longitudinally spaced driving disks within said enclosure and mounted for movement downstream therearound
   said driving disks being driven downstream through said enclosure past said filter section for discharging at least a portion of said filterable component through said filter section and said residual material component through said outlet
   said enclosure having a backflow preventing, differential piston portion of reduced inner cross section area upstream from said inlet and downstream from said filter section between said filter section and said inlet for driving said driving disks downstream through said enclosure by flow from said inlet to said filter section, and
   said plurality of radially compressible longitudinally spaced driving disks within said enclosure sealingly contacting its inner walls at least in said backflow preventing portion.

7. Filter apparatus as claimed in claim 1, 2, 5 or 6, wherein
    said enclosure has a filter flow increasing portion of reduced inner cross section area adjacent said filter section.

8. Filter apparatus as claimed in claim 1, 2, 5, 6 or 7, wherein
    said plurality of radially compressible longitudinally spaced driving disks within said enclosure sealingly contact its inner walls in said filter section.

* * * * *

UNITED STATES PATENT AND TRADEMARK OFFICE
CERTIFICATE OF CORRECTION

PATENT NO. : 4,328,098

DATED : May 4, 1982

INVENTOR(S) : Robert A. Benson

It is certified that error appears in the above-identified patent and that said Letters Patent are hereby corrected as shown below:

Column 4, line 30, "outlets 24" should be --outlets 26--;

lines 56-57, "contenplated" should be --contemplated--;

Column 5, line 57, "associated with an outlet" should be --associated with a filtered material outlet--.

Signed and Sealed this

Twentieth Day of July 1982

[SEAL]

Attest:

GERALD J. MOSSINGHOFF

Attesting Officer      Commissioner of Patents and Trademarks